(12) United States Patent
Henry

(10) Patent No.: US 8,625,212 B2
(45) Date of Patent: Jan. 7, 2014

(54) SYSTEM FOR GUIDING OPTICAL ELEMENTS

(75) Inventor: Didier Henry, Lustenau (AT)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 358 days.

(21) Appl. No.: 13/025,926

(22) Filed: Feb. 11, 2011

(65) Prior Publication Data

US 2011/0199675 A1   Aug. 18, 2011

(30) Foreign Application Priority Data

Feb. 11, 2010   (DE) .......................... 10 2010 001 858

(51) Int. Cl.
  *G02B 7/02*   (2006.01)
  *G02B 21/00*  (2006.01)
  *G02B 7/09*   (2006.01)
  *G02B 7/04*   (2006.01)
  *G02B 7/00*   (2006.01)

(52) U.S. Cl.
  CPC .. *G02B 7/09* (2013.01); *G02B 7/04* (2013.01); *G02B 7/00* (2013.01)
  USPC ............ 359/824; 359/379; 359/380; 359/814

(58) Field of Classification Search
  USPC ......... 359/368, 379–383, 684–706, 813–814, 359/823–824, 819
  See application file for complete search history.

(56) References Cited

U.S. PATENT DOCUMENTS 5,515,210 A * 5/1996 Devenyi .......................... 359/823
5,675,442 A * 10/1997 Parks ............................. 359/701
5,745,470 A * 4/1998 Nagai et al. ................... 720/678

FOREIGN PATENT DOCUMENTS

JP      08304361 A    11/1996
WO      96/34306 A1   10/1996

OTHER PUBLICATIONS

German Search Report, mailed Oct. 7, 2010, from DE 10 2010 001 858.9-51, filed Feb. 11, 2010.

* cited by examiner

*Primary Examiner* — Thong Nguyen
(74) *Attorney, Agent, or Firm* — Patentbar International, P.C.

(57) ABSTRACT

A system for guiding optical elements, in particular lenses, along an optical axis of a microscope, in particular a stereomicroscope, or of a macroscope, guide system including at least one guide rod which extends parallel to the optical axis and is at least partially made from a magnetizable material, and further including a carrier for the optical elements, the carrier being displaceable along the at least one guide rod and providing magnetic attraction between itself and at least one guide rod; for providing magnetic attraction, including at least one magnetizable wheel adapted to roll along the at least one guide rod while rotating about an axis as the carrier is displaced; the at least one guide rod (312, 314) being made of magnetizable material and/or the magnetizable wheel being at least in part permanently magnetic.

11 Claims, 8 Drawing Sheets

Prior Art

Prior Art

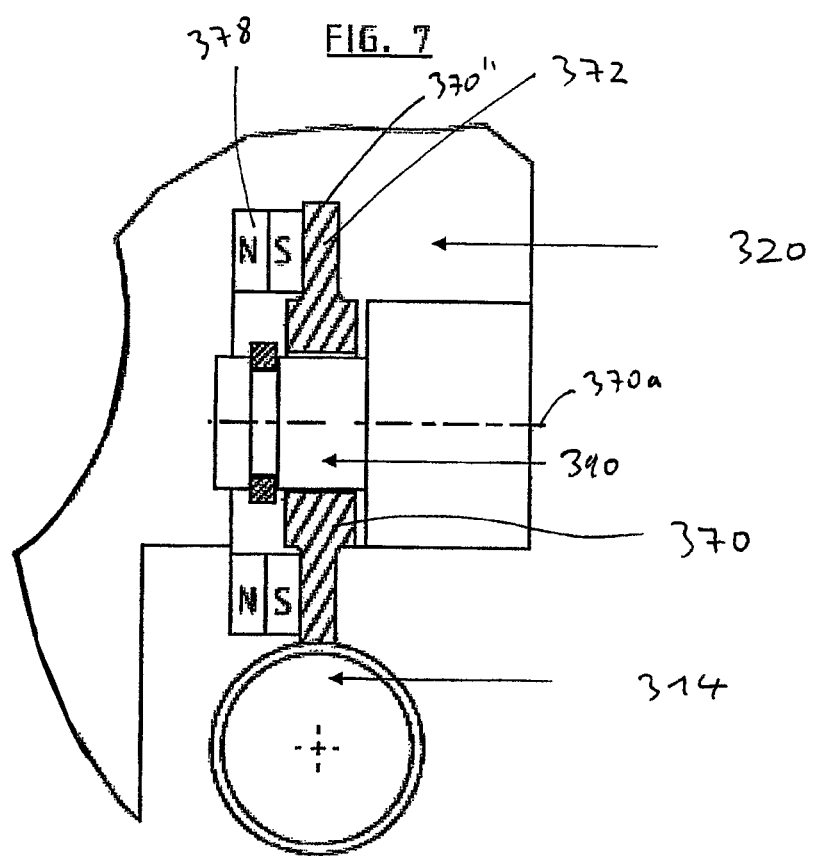

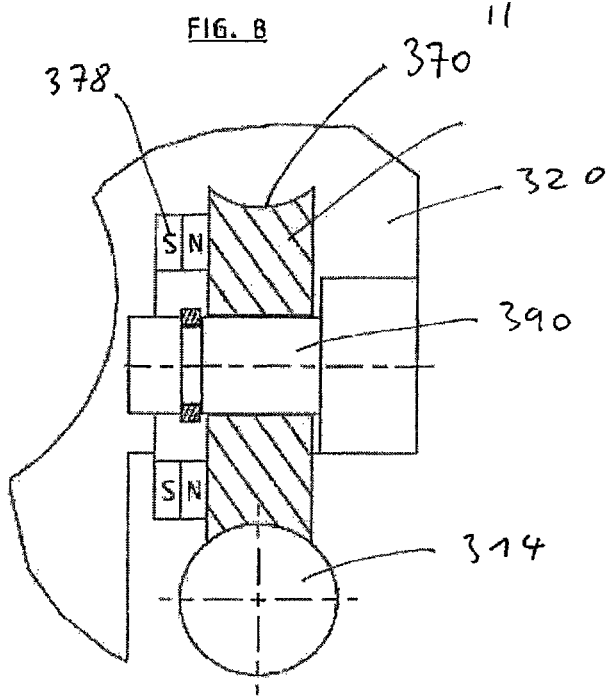
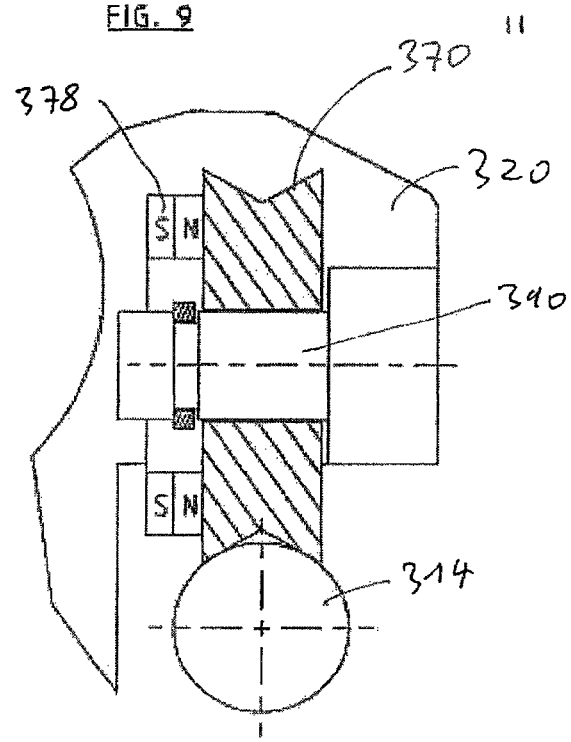

SYSTEM FOR GUIDING OPTICAL ELEMENTS

BACKDROUND OF THE INVENTION

The present invention relates to a system for guiding optical elements, as defined in the preamble of claim 1.

Such systems are used, for example, in zoom systems, in which optical assemblies such as lenses or lens groups are moved relative to one another. For example, in a zoom system, the individual zoom-system components made up of individual lenses or lens groups are moved relative to one another along the optical axis of the zoom system.

Patent Publication WO 96/34306 describes a play-free lens guide system in which lens slides are held by magnets to two guide rods and are movable therealong without play. In that system, one or more lenses are mounted in lens slides. The lens slide is moved along one of the guide rods by rotation of a drum cam which is engaged by a cam follower disposed on one side of the lens slide. The term "lens slide" as used in that patent and herein is understood to refer to mechanical components adapted to receive lenses or mounted lens groups. These lenses or lens groups may also be axially or laterally adjustable. The lenses or lens groups are guided by the lens slide along their optical axis as the lens slide itself is moved along an axis parallel to the optical axis. Thus, lens slides constitute a special type of carrier for optical elements.

Since such lens slides are acted upon only at one (first) guide rod, they tend to become rotated or tilted out of alignment. Rotation about the one (first) guide rod is prevented by engagement on the second guide rod.

Overall, large magnetic forces are required here to secure the lens slides on the guide rods in a substantially tilt-free manner. However, these large magnetic forces result in high friction and stiffness of adjustability, for example, of a zoom adjustment.

BRIEF SUMMARY OF THE INVENTION

It is, therefore, an object of the present invention to provide a play-free guide system for optical elements, in particular for lenses of a zoom system, which moves more easily or smoothly during adjustment than those known in the prior art.

It is a feature of the guide system of the present invention that in order to provide magnetic attraction between the carrier for an optical element, particularly a lens slide (see definition above) for at least one lens, and at least one guide rod at least partially made of magnetic or magnetizable material, the carrier is provided with a magnetic or magnetizable wheel adapted to roll along the at least one magnetizable guide rod as the carrier is displaced therealong. The term "wheel" as used herein is understood to refer in particular to a component that is rotatable about an axis. Moreover, the term "wheel" used herein is not meant to impose any limitation on the axial dimension, i.e., the width, of the peripheral rolling surface, so that thin or disk-like bodies, as well as wide, i.e., roller- or cylinder-like bodies, are also encompassed by this term. It should be noted that according to the present invention the magnetizable or magnetic wheel rolls in the direction parallel to the longitudinal axis of the guide rod. Hereby, the contact area between (cylindrical) rod and wheel is minimized.

The term "axis" as used herein may include both the (mathematical) axis of rotation, and a (physical) axis or axle about which the wheel rotates. Depending on the context, it is also possible that only one of these two meanings applies.

The term "magnetizable" as used herein is understood to mean "made partially or entirely of a magnetizable material".

The term "magnetizable", which is used herein in particular for the guide rod and the wheel, is intended to include in particular permanent magnetic materials (also referred to as "hard magnetic" or magnetically hard materials) and soft magnetic (magnetically soft) materials.

According to the terminology commonly used in the art, permanent magnetic materials are understood to be materials which are composed of a magnetizable material, for example, a ferromagnetic material such as iron, cobalt, nickel or ferrite, and which produce a permanent static magnetic field without relying on an external magnetic field or a flow of electric current.

Similarly, in accordance with conventional terminology, soft magnetic materials are understood to be, for example, ferromagnetic materials which can easily be magnetized in a magnetic field caused, for example, by the presence of a permanent magnet. Examples of soft magnetic materials include metals and metal alloys based on the ferromagnetic metals iron, cobalt and nickel. Ceramic materials, such as metal oxide based ferrites, may also be mentioned merely by way of example.

Thus, in accordance with the terminology used, the present invention especially comprises guide rods having soft magnetic properties in combination with wheels having permanent magnetic properties and being adapted to roll thereon and, conversely, guide rods having permanent magnetic properties and wheels having soft magnetic properties and being adapted to roll thereon. Also included is a combination of guide rods having permanent magnetic properties and wheels which also have permanent magnetic properties to roll thereon.

Thus, magnetic attraction forces of similar magnitude may be provided between the carriers and guide rods, in particular to prevent tilting, while at the same significantly reducing the occurring frictional forces and effects. This significantly increases the ease of movement of the guide system during adjustment. The magnetizable wheels according to the present invention are both easy to mount and capable of providing a constant force.

Advantageous embodiments of the system or device according to the present invention are the subject matter of the dependent claims.

In accordance with a preferred embodiment, the magnetizable wheel comprises a ring-shaped permanent magnet adapted to roll along the guide rod. Such a permanent magnet (ring magnet) has a ring-shaped south pole in a first plane and a corresponding, ring-shaped north pole in a second plane (located thereabove). The ring-shaped permanent magnet is adapted to roll along the guide rod. It is a feature of this embodiment that the number of parts required is very small.

In accordance with another preferred embodiment, the magnetizable wheel comprises a soft magnetic (magnetically soft) wheel adapted to roll along the guide rod, at least one permanent magnet being provided on at least one (axial) side of the soft magnetic wheel. Overall, therefore, a magnetizable wheel is provided which, according to the terminology used herein, has permanent magnetic properties. This embodiment comprises both the provision of a suitable number of small permanent magnets arranged around a side or side face of the wheel, and the provision of a ring-shaped magnet on the soft magnetic wheel. Providing a number of (smaller) permanent magnets turns out to be less expensive than using a ring-shaped magnet.

Advantageously, permanent magnets are provided on both sides of the soft magnetic wheel.

In both embodiments, it is advantageous to distribute a number of magnets uniformly around the circumference of the wheel (either on one or both sides).

The poles of the at least one permanent magnet are preferably axially aligned with each other with respect to the axis of the soft magnetic wheel. This means, for example, that the north poles of all permanent magnets are directly adjacent or in direct contact with the wheel, while the south poles, which are adjacent to the north poles, have a greater (axial) distance from the wheel. Of course, an arrangement in reverse order is also possible (with the south poles directly on the wheel).

Care must be taken to ensure that all magnets on one side of the wheel have the same axial orientation.

In the case that permanent magnets are provided on both sides of the wheel, it is advantageous to ensure that the poles of the permanent magnets on different sides of the wheel are oriented in opposite directions with respect to each other. That means, for example, that on both sides, all north poles are farther away from the respective side faces of the wheel than the south poles, or vice versa.

Advantageously, the physical axis (axle) about which the magnetizable wheel rotates as it rolls along the guide rod is made from a non-magnetizable or non-magnetic material. This makes it possible to prevent magnetic flux from passing through the axis (axle), which would reduce the magnetic forces acting between the carrier and the guide rod. However, the axis (axle) may also be made of a magnetizable material. In this case, it is advantageous to ensure that sufficient clearance is provided between the axis (axle) or axis of rotation and the at least one permanent magnet formed on the wheel.

It is also preferred that the magnetizable wheel be mounted rotatably about a (physical) axis (axle), either with or without using a ball bearing for supporting the wheel. The use of a ball bearing allows particularly easy movement during adjustment. On the other hand, in comparison with the prior art, the frictional forces caused by the magnetic attraction are reduced to such an extent that the wheel may also be rotatably supported directly; i.e., without using a ball bearing.

Moreover, it is preferred that the peripheral rolling surface (contact surface) of the magnetizable wheel have a profiled shape. By adapting such a profile to match the shape of a guide rod, it is advantageously possible to further stabilize the rolling motion of the wheel along the guide rod.

It is preferred to provide two guide rods, along each of which rolls at least one magnetizable wheel. In this embodiment, tilting and rotation out of alignment is prevented in a particularly effective manner.

In a further preferred embodiment, one guide rod is engageable by at least one pair of magnetizable wheels arranged in a V-shape with respect to one another. With this feature, the special advantages offered by a V-shaped groove in terms of resistance to tilting and rotation may also be used in the present invention.

The system according to the present invention is particularly suitable for use in microscopes, in particular stereomicroscopes, or in macroscopes, where accurate positioning of lenses is of essential importance, and where any tilting and/or rotation of the lenses with respect to their optical axis reduces the image quality.

BREIF DESCRIPTION OF THE SEVERAL VIEWS OF THE DRAWINGS

The present invention will now be described in more detail with reference to the attached drawings, in which:

FIG. 7 is a bottom view corresponding to that of FIG. 5, showing another preferred embodiment of the present invention;

FIG. 8 is a bottom view corresponding to that of FIG. 5, showing a further preferred embodiment of the present invention; and FIG. 9 is a bottom view corresponding to that of FIG. 5, showing yet another preferred embodiment of the present invention.

DETAILED DESCRIPTION OF THE INVENTION

Figure 1:
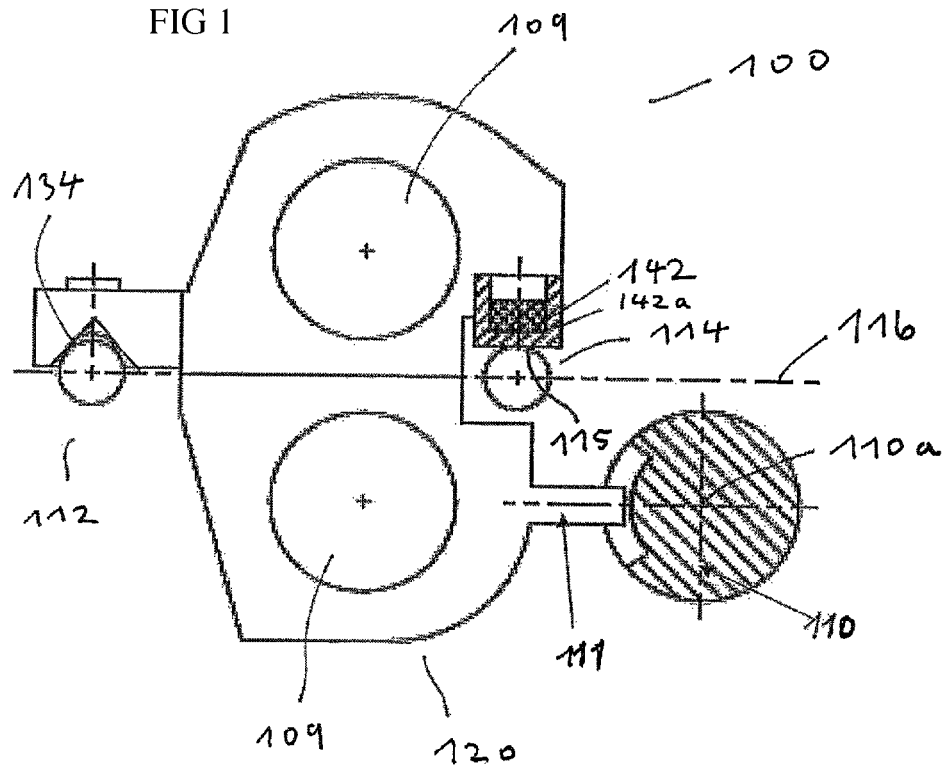
FIG. 1 is a cross-sectional view showing a prior art lens guide system from below.
Figure 2:
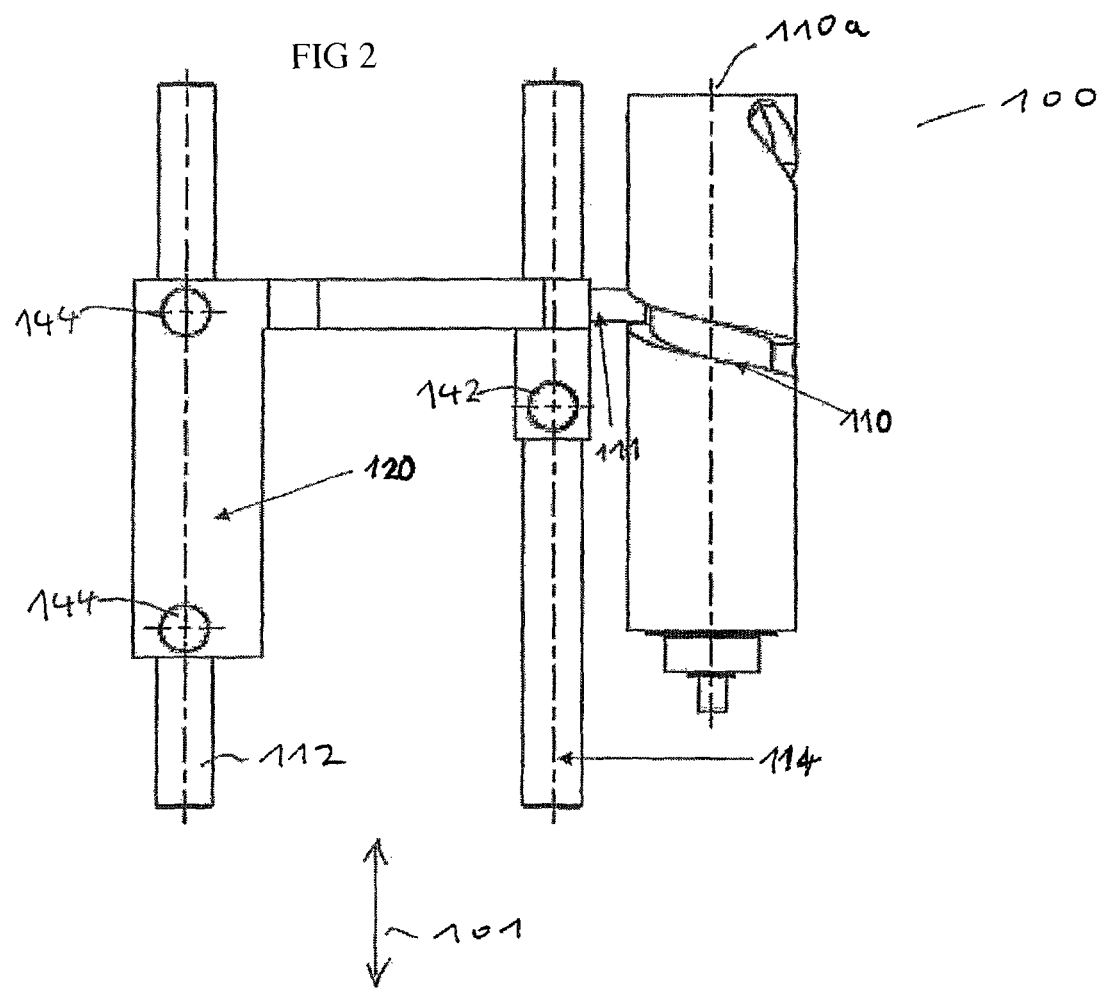
FIG. 2 is a side view of the system of FIG. 1.

The prior art guide system or device for a stereomicroscope illustrated in FIGS. 1 and 2 is denoted as a whole by reference numeral 100. The device shown includes two guide rods 112, 114, guide rod 112 being designed as the main guide rod, and guide rod 114 being designed as an anti-rotation means. A lens slide 120 is movable along guide rods 112, 114; i.e., in the directions of double-headed arrow 101 shown in FIG. 2. This movement corresponds to a movement along (i.e., parallel to) the optical axes of lenses 109 mounted in lens slide 120. The illustrated arrangement of two lenses disposed at the same height corresponds to the configuration of a stereomicroscope in which two parallel observation beam paths are provided. Typically, a zoom system has two or more such lens slides which are arranged one above the other and displaceable on guide rods 112, 114.

Lens slide 120 has a V-shaped groove 134 by which it is guided along guide rod 112.

Reference numeral 110 denotes a drum cam which is engaged by a cam follower 111 of lens slide 120. When drum cam 110 is rotated about its longitudinal axis 110a manually or by motor means, a force F is exerted on lens slide 120. A first component of this force acts in the direction of guide rod 114; i.e., in the direction of double-headed arrow 101, and a second force component acts tangentially to drum cam 110; i.e., perpendicularly into or out of the plane of the paper of FIG. 2.

The aforementioned first force component in the direction of double-headed arrow 101 must overcome a holding force and the resulting friction of lens slide 120 on guide rods 112, 114.

Because of the distance of cam follower 111 from guide rod 112, there is a tendency of lens slide 120 to tilt out of a plane perpendicular to guide rod 112. In the event of such tilting, the centers of lenses 109 migrate out of their proper positions as a result of the aforementioned V-shaped configuration of guide groove 134. Such tilting turns out to be very disadvantageous, especially in stereomicroscopes.

Furthermore, the aforementioned second force component (tangential to drum cam 110) creates a tendency for lens slide 120 to rotate about the longitudinal axis of guide rod 112. This rotation also causes the centers of lenses 109 to migrate out of their proper positions.

In order to counteract these tilting and rotational movements, permanent magnets are formed on lens slide 120 which interact with guide rods 112, 114 made of magnetizable (e.g., soft magnetic) material, producing magnetic attraction. A permanent magnet, denoted as 142, which interacts with guide rod 114 is shown particularly well in FIG. 1. Two magnets interacting with guide rod 112 are denoted as 144. The holding force mentioned above is generated or substantially affected by these magnets. During rotation of the drum cam, the lens slide slides along the guide rods, held thereto by the magnetic force. Here, the permanent magnet is supported in a pocket 142a. Such a pocket makes it possible to provide a defined distance between the permanent magnet and the guide rod. The pocket may be manufactured, for example, from a magnetizable (soft magnetic) material, such as metal.

Permanent magnets 144 interacting with guide rods 112 serve to hold lens slide 120 to guide rod 112 and to prevent the aforementioned tilting movements.

Magnet 142, which interacts with guide rod 114, also serves to prevent rotation of lens slide 120 about guide rod 112. It does so by attracting lens slide 120 onto guide rod 114. To this end, the lens slide (shell 142a in the variant shown) has a flat surface 115 extending parallel to the aforementioned V-shaped groove 134, which is disposed on the other side of lens slide 120 for engagement with further guide rod 112.

Magnet 142, which is disposed behind this surface 115; i.e., behind shell 142a, at a distance from rod 114, presses this surface against rod 114. If surface 115 and V-groove 134 are not exactly parallel, then there will be a conflict; i.e., the lens slide will rotate out of position. In this case, typically, not the entire surface 115 is in contact with rod 114, but only an edge thereof, which also causes abrasion. This requirement of parallelism of the surfaces is eliminated in accordance with the present invention by using a wheel and by a point contact thereby produced, as will be discussed in greater detail below.

Overall, very large magnetic forces are required to hold lens slide 120 to the guide rods 112 and 114 against the action of the aforementioned force F and the force of gravity, and possibly against acceleration forces, which may occur, for example, in response to an impact. In this connection, the force of gravity to be compensated is dependent on the (variable) spatial orientation of the stereomicroscope. In the extreme case, the force of gravity acts in the same direction as one of the aforementioned components of force F. In this case, too, the magnetic force produced must be sufficient to compensate for the total arising force.

Canting of V-shaped groove 134 with respect to the plane 116 passing through the central axes of guide rods 112, 114 also results in increased abrasion.

However, the high magnetic forces that are required to avoid these disadvantages and which are provided by the interaction of magnets 142, 144 with the guide rods cause high friction and increased resistance to movement of lens slide 120 during adjustment.

Overall, the prior art requires a lens slide that has very small tolerances, because the holding force of the magnets used is highly dependent on their distance from the respective guide rods. In order to keep the occurring magnetic forces within tight tolerance limits, it is therefore necessary to provide for very accurate mounting of the magnets and/or adjustment of the distances between the magnets and the guide rods.

A first preferred embodiment of the present invention will now be described with reference to FIGS. 3 and 4. Similarly to the prior art described above, the guide system of the present invention (denoted as a whole by reference numeral 300) includes two guide rods 312, 314 having soft magnetic properties and a lens slide 320 displaceable on said guide rods parallel to an optical axis 400. Lens slide 320 has cam follower 311, which engages a drum cam 310. When drum cam 310 is rotated, a force F is exerted on lens slide 320, moving lens slide 320 along guide rods 312, 314. The force components acting as mentioned in the description of the prior art must be compensated here as well.

In this embodiment, lens slide 320 is formed with a magnetizable wheel 370 having permanent magnetic properties, said wheel being mounted on lens slide 320 such that it is rotatable about an axis of rotation 370a. Magnetic interaction between this wheel 370 and soft magnetic guide rod 314 produces magnetic attraction between wheel 370 and guide rod 314. During displacement of lens slide 320, wheel 370 rolls along guide rod 314 while maintaining the force of magnetic attraction.

The magnetic properties of wheel 370 are selected or dimensioned so as to provide the required holding force at guide rod 314. Since wheel 370 is able to roll along guide rod 314 as lens slide 320 is displaced, the frictional forces occurring in the process can be minimized, as compared to the prior art. Therefore, if desired, the holding force can be selected to be of a higher magnitude than is possible in the prior art. There is no need for fine adjustment of the distance between the wheel and the guide rod because the wheel rolls on the guide rod.

The guidance of lens slide 320 on further guide rod 312 can also be accomplished using such magnetizable or permanent magnetic wheels. In the representation of FIG. 3, a pair of such wheels 380, 382 are provided, which are mounted on lens slide 320 such that they are rotatable about respective axes of rotation 380a and 382a, and are adapted to roll along guide rod 312 as the lens slide is displaced. Wheels 380, 382 are arranged at an angle with respect to each other, so that the guidance of lens slide 320 along guide rod 312 is similar to that provided by the V-shaped groove in accordance with the prior art. In this embodiment, one such pair of wheels is provided, as is shown schematically in FIG. 4. Thus, FIGS. 3 and 4 show an embodiment having a pair of wheels provided at rod 312, the magnets 344 provided further above being configured in accordance with the prior art. It should be noted that these magnets could also be configured as a pair of wheels. Such an embodiment would then include a total of two pairs of wheels.

Figure 3:
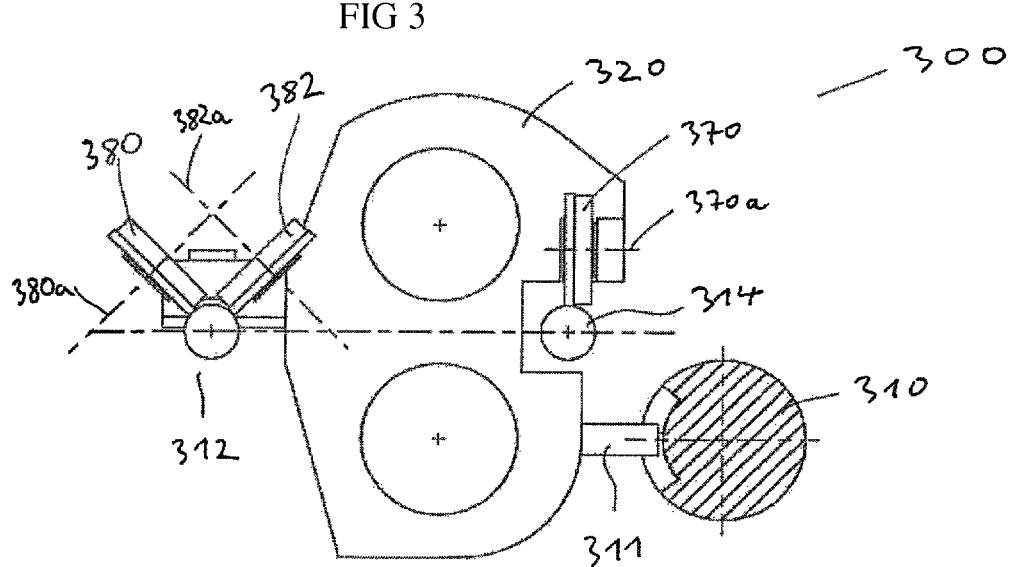
FIG. 3 is a bottom view corresponding to that of FIG. 1, showing a first preferred embodiment of the system according to the present invention.
Figure 4:
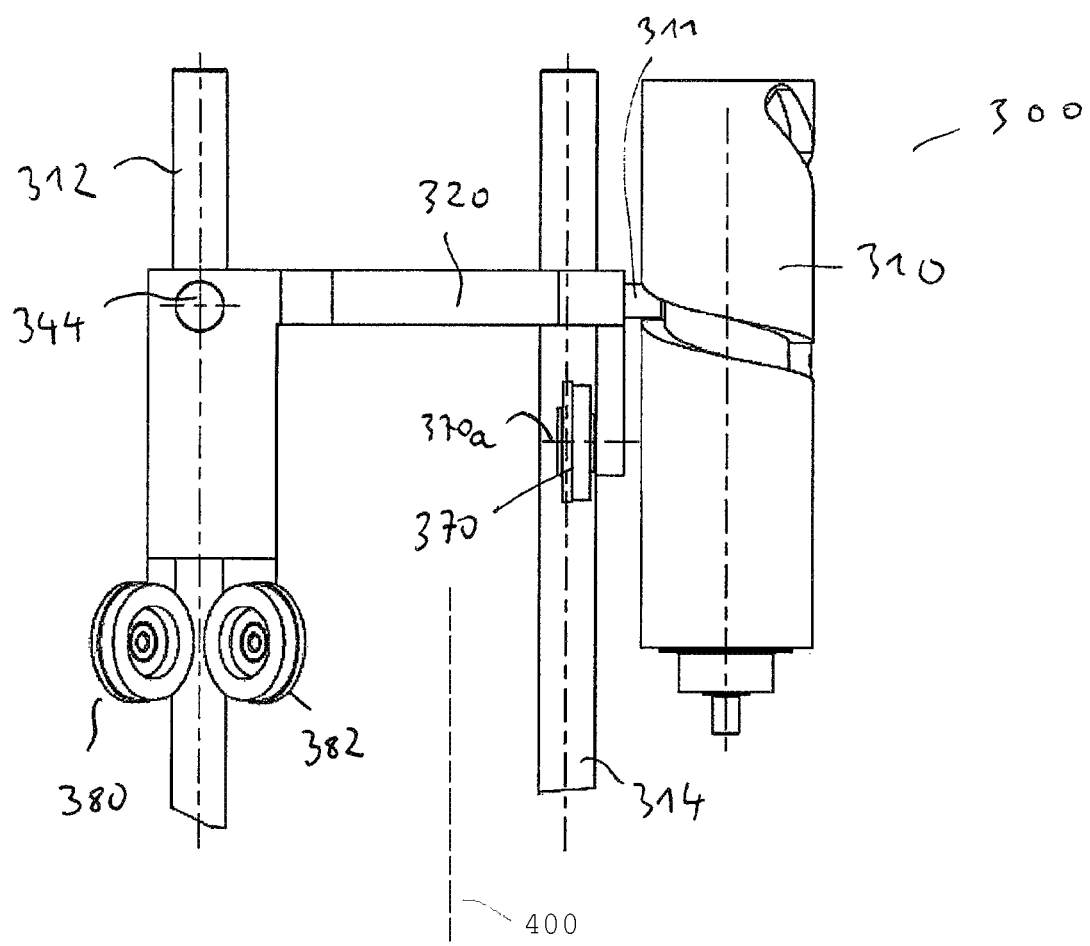
FIG. 4 is a side view (corresponding to that of FIG. 2) of the embodiment of FIG. 3.

As an alternative to the angled or V-shaped arrangement of wheels 380, 382, as shown in FIGS. 3 and 4, it is also conceivable to provide only one wheel, and to configure said wheel to have a, for example, V-shaped peripheral surface on which it rolls along guide rod 312. Examples of this will be given below.

Preferred embodiments of the wheels used in accordance with the present invention will now be described with reference to FIGS. 5 through 9, which each show guide rod 314 and the adjacent portion of lens slide 320. The wheels shown each have side faces 370' and a peripheral rolling surface 370". Similar designs may also be provided to engage guide rod 312. In this case, and in the embodiments described hereinbelow, the wheels may be arranged, in particular, in the shape of a V with respect to each other. In all embodiments described hereinafter, the wheel has permanent magnetic properties. It is noted once again that it is also within the scope of the present invention that the guide rod may be permanently magnetic, and that in this case, a wheel interacting therewith may be soft magnetic, for example.

Figure 5:
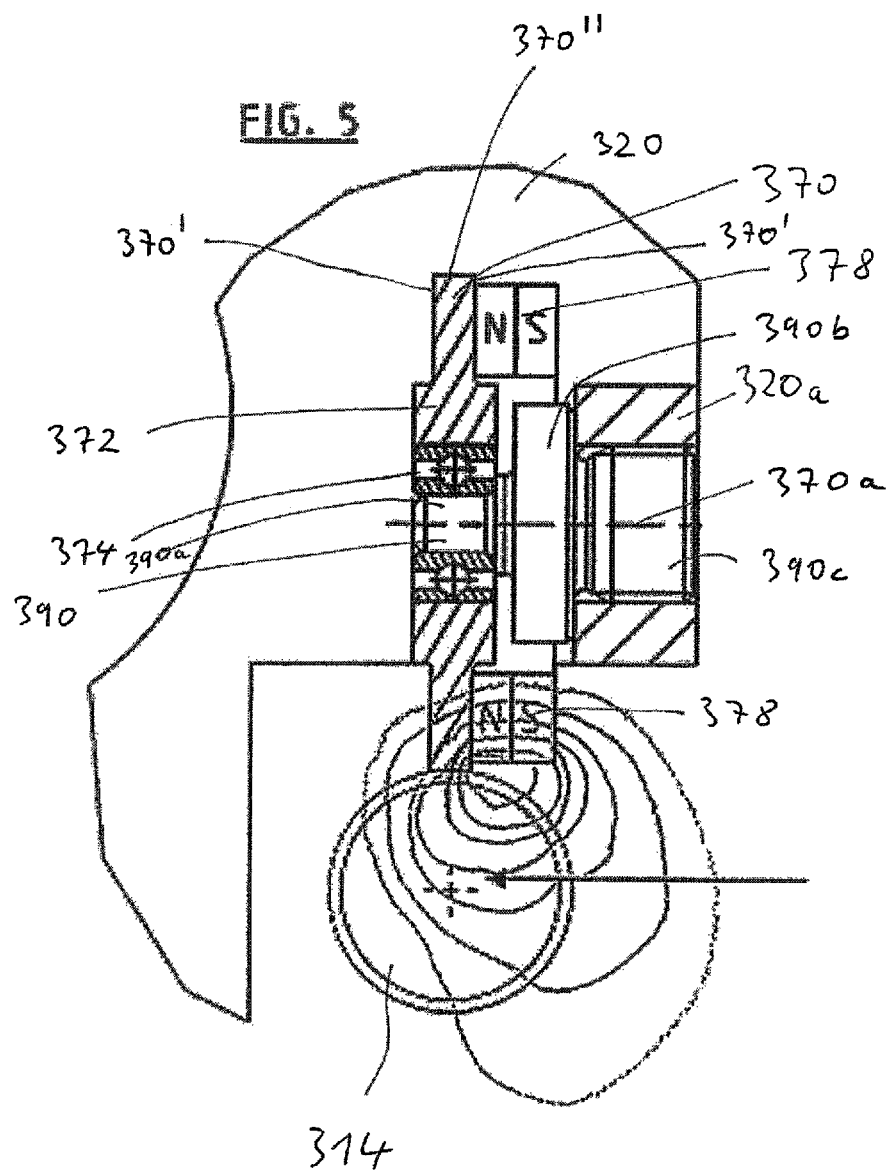
FIG. 5 is a detailed cross-sectional bottom view of a portion of another preferred embodiment of the present invention.

In the embodiment shown in FIG. 5, wheel 370 includes a wheel 372 which is ferromagnetic or made from soft magnetic material and which is mounted by a ball bearing 374 so that it is rotatable about the (mathematical) axis of rotation 370a.

Permanent magnets 378 are mounted on a side face 370', i.e., on one side, of soft magnetic wheel 370. It is possible, for example, to provide a number of permanent magnets 378 arranged laterally around the circumference of wheel 372. In such a configuration, the individual permanent magnets 378 must be oriented such that identical poles (represented by the north pole in FIG. 5) are in contact with side face 370' of wheel 372, so that the magnetic flux passing through the north pole, wheel 372, guide rod 314 and the south pole altogether produces magnetic attraction between wheel 370 and guide rod 314. The corresponding magnetic field lines are shown schematically in FIG. 5. In such a configuration, the magnetic flux (circuit) is closed in the outer or edge region of wheel 372.

Of course, it is equally possible to attach the respective south poles of magnets 378 to side face 370' of wheel 372 so as to achieve a corresponding magnetic flux.

Instead of using individual magnets 378, it is also possible to provide a ring magnet having a corresponding polarity.

As for the design of wheel 370, it is advantageous if the (non-rotating) axis axle 390; i.e., the immediate vicinity of the axis of rotation 370a, is made from non-magnetizable, for example, non-ferromagnetic, material so as to prevent magnetic flux from passing through the axis (axle), which would reduce the magnetic attraction between the wheel and the guide rod. However, it should be noted that axis (axle) 390 may also be made of magnetizable material. In this case, it is advantageous to ensure that the permanent magnets have a sufficient distance from axis (axle) 390 and axis of rotation 370a.

Advantageously, axis (axle) 390 has a first end 390a which is inserted or pressed into the ball bearing, a central portion 390b configured as an axial stop, and a second end 390c inserted in a mount 320a of lens slide 320. Of course, axis (axle) 390 shown here serves merely as an example. Other suitable shapes are also possible.

As can be seen in FIG. 5, soft magnetic wheel 372 rolls along guide rod 314 as lens slide 320 is displaced, the spacing between magnets 378 and guide rod 314 remaining constant in the process. This is useful in order to be able to adjust the magnetic force to a desired magnitude and to further reduce frictional forces. However, it is also possible to allow contact between magnets 378 and guide rod 314 as wheel 370 rolls therealong.

Figure 6:
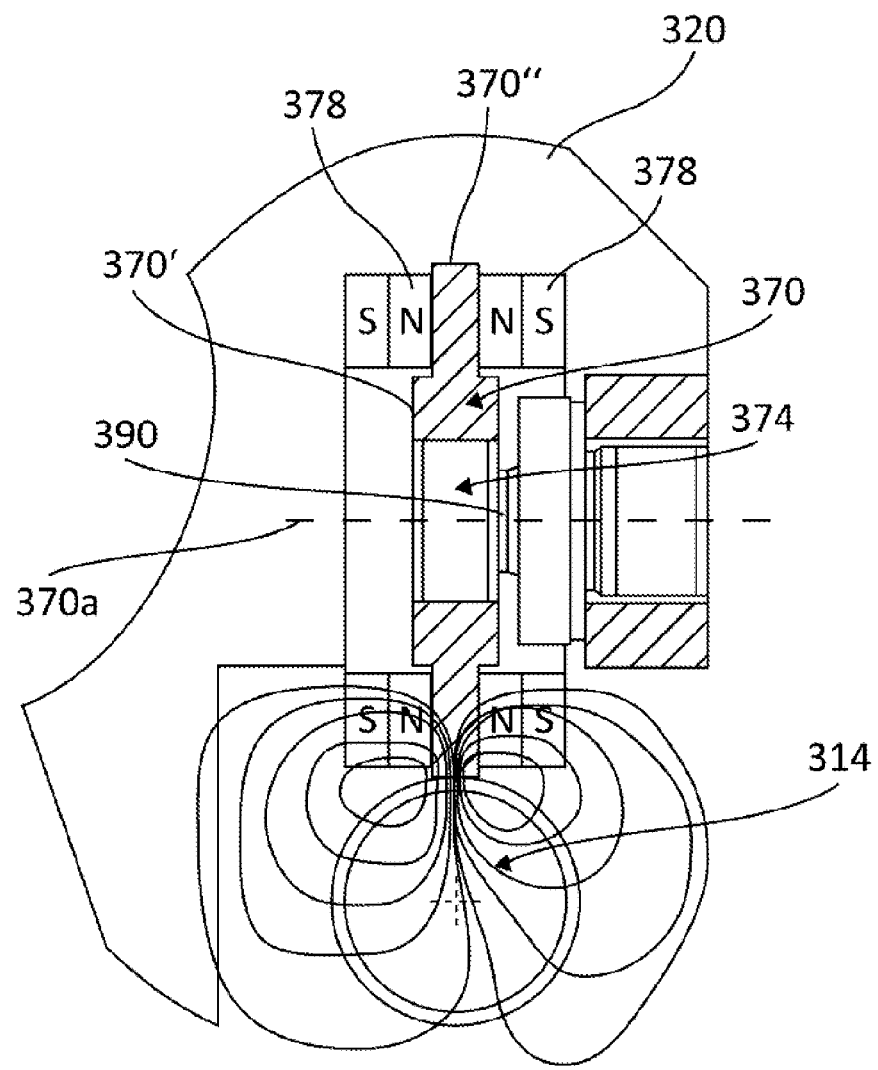
FIG. 6 is a bottom view corresponding to that of FIG. 5, showing a further preferred embodiment of the present invention.

Another variant of a wheel according to the present invention is shown in FIG. 6. This variant differs from that shown in FIG. 5 mainly in that magnets 378 are provided on both sides of wheel 372. This embodiment allows a relatively large magnetic force to be provided within a very small space. The magnetic flux produced is illustrated schematically by the field lines.

In this embodiment, too, soft magnetic wheel 372 is rotatably mounted in a ball bearing 374, shown schematically here. Here, too, the axis (axle) (not shown in greater detail here) is made from non-magnetizable material.

FIG. 7 shows another preferred embodiment of a wheel 370 that can be used in accordance with the present invention. First of all, it can be seen that, unlike the embodiments shown in FIGS. 5 and 6, the respective south poles of individual magnets 378 (or, when a ring-shaped magnet is used, the south pole of this magnet) are in contact with the surface of soft magnetic wheel 372.

It is a feature of this embodiment that the bearing arrangement for the wheel is simplified as compared to the embodiments of FIGS. 5 and 6. Specifically, no ball bearing is provided here. Rather, wheel 372 is rotatably mounted, directly on axis (axle) 390.

Finally, FIGS. 8 and 9 show further preferred embodiments of the magnetizable wheels according to the present invention. It is a feature of the embodiments of FIGS. 8 and 9 that the peripheral rolling surfaces 370" of wheels 370 have a profiled shape, the respective profiles being complementary to the particular guide rod 314 on which the wheels are adapted to roll.

In the embodiment of FIG. 8, peripheral surface 370" of the magnetizable, in particular permanent magnetic wheel 370 is circular arc-shaped and, therefore, conforms to the circular cross section of guide rod 314 with any desired accuracy.

In this connection, it is also conceivable for the guide rod and/or the peripheral surface of the wheel to have other curvatures, such as elliptical curvatures.

In the embodiment of FIG. 9, peripheral wheel surface 370" has a V-shaped profile. This profile, too, improves the guidance of the wheel on the guide rod.

In the embodiments of FIGS. 8 and 9, the bearing means for supporting wheels 370 on axis (axle) 390 correspond to those of FIG. 7 and, therefore, will not be described again in detail here. A bearing arrangement using one or more ball bearings would also be conceivable.

The guide system of the present invention is suitable for use in Greenough-type stereomicroscopes, in stereomicroscopes having parallel zoom telescopes, and also in single-channel zoom macroscopes.

The magnetizable wheels are supported with as little play as possible. For this purpose, it is possible to use, for example, commercially available precision components and/or precision ball bearings.

In addition to the aforementioned advantageous effects in terms of the reduction of friction, magnetizable wheels 370 that are used in accordance with the present invention are characterized by less abrasion compared to the sliding components used in the prior art.

Moreover, wheels provide a point contact which offers greater resistance to tilting than the area contact according to the prior art. Without the use of wheels which roll along guide rods, it is impossible to achieve a point contact. This advantage has been discussed earlier herein in connection with V-shaped grooves such as are known in the prior art, and also in connection with a V-shaped arrangement of two wheels.

The guide system of the present invention is particularly suitable for use in stereomicroscopes, where it is crucial that, during adjustment of the zoom system, the positionable lens elements of the observation channels do not become offset or tilted relative to the optical axis of the zoom system.

What is claimed is:

1. A system for guiding optical elements or lenses, along an optical axis of a microscope, or of a stereomicroscope, or of a macroscope, said guide system comprising
at least one guide rod which extends parallel to the optical axis and is at least partially made from a magnetizable material, and
further comprising a carrier for the optical elements, said carrier being displaceable along the at least one guide rod and having means for providing magnetic attraction between itself and the at least one guide rod,
wherein the means for providing magnetic attraction include at least one magnetizable wheel adapted to roll along the at least one guide rod while rotating about an axis as the carrier is displaced, the at least one guide rod being at least partially made of magnetizable material and/or the magnetizable wheel being at least in part permanently magnetic.

2. The system as recited in claim 1, wherein the magnetizable wheel includes a ring-shaped permanent magnet adapted to roll along the at least one guide rod.

3. The system as recited in claim 1, wherein the magnetizable wheel includes a soft magnetic wheel adapted to roll along the at least one guide rod, at least one permanent magnet being provided on at least one side or side face of the soft magnetic wheel.

4. The system as recited in claim 3, wherein poles of the at least one permanent magnet are axially aligned with each other with respect to an axis of rotation of the soft magnetic wheel.

5. The system as recited in claim 3 wherein at least one permanent magnet is provided on each of two sides of the soft magnetic wheel, wherein poles of the permanent magnets on different sides of the soft magnetic wheel are oriented in opposite directions with respect to each other.

6. The system as recited in claim 1, wherein the axis (axle) about which the magnetizable wheel rotates is made from a non-magnetic material or a magnetizable material.

7. The system as recited in claim 1, wherein the wheel is mounted about the axis (axle) either with or without using a ball bearing.

8. The system as recited in claim 1, wherein a peripheral rolling surface of the magnetizable wheel has a profiled shape.

9. The system as recited in claim 1, wherein two guide rods are provided, along each of which rolls at least one magnetizable wheel.

10. The system as recited in claim 1, wherein at least one pair of magnetizable wheels arranged in a V-shape with respect to one another is provided at one guide rod to roll therealong.

11. A microscope, or a stereomicroscope, or a macroscope, comprising a system according to claim 1.

* * * * *